United States Patent [19]
Adamson et al.

[11] Patent Number: 5,630,599
[45] Date of Patent: May 20, 1997

[54] SHOPPING CART HAVING IMPROVED CHILD SEAT

[75] Inventors: Mark A. Adamson; Val-Jean Duchene, both of Broken Arrow, Okla.

[73] Assignee: Unarco L.L.C., Chicago, Ill.

[21] Appl. No.: 658,195

[22] Filed: Jun. 4, 1996

[51] Int. Cl.⁶ .................................................. B62B 3/02
[52] U.S. Cl. ............................................. 280/33.993
[58] Field of Search .......................... 280/33.991, 33.992, 280/33.993; 297/250, 463

[56] References Cited

U.S. PATENT DOCUMENTS

| | | | |
|---|---|---|---|
| 2,837,344 | 6/1958 | Young | 280/33.993 |
| 2,890,059 | 6/1959 | Brooks et al. | 280/33.993 |
| 3,042,032 | 7/1962 | Vogel | 280/33.993 |
| 3,157,410 | 11/1964 | Hammer | 280/33.993 |
| 3,168,327 | 2/1965 | Lachance | 280/33.993 |
| 3,306,661 | 2/1967 | Allen | 280/33.993 |
| 4,682,782 | 7/1987 | Mills | 280/33.993 |
| 5,020,811 | 6/1991 | Ondrasik | 280/33.993 |
| 5,348,323 | 9/1994 | Trubiamo | 280/33.993 |

*Primary Examiner*—Richard M. Camby
*Attorney, Agent, or Firm*—Dressler, Rockey, Milnamow & Katz, Ltd.

[57] ABSTRACT

In a shopping cart having a handle with two generally vertical portions and a generally horizontal portion and having a main basket, a child seat comprises a primary panel, a secondary panel, and a tertiary panel, each panel being made from welded wires. Defining a back panel of the main basket and a front panel of the child seat and being mounted pivotally to the generally vertical portions of the handle, the primary panel includes generally parallel wires spaced from one another by not more than about two inches. Defining a lower panel of the child seat, the secondary panel has a substantially open portion and a weight-supporting portion, which includes similarly spaced wires. Below where the primary panel is mounted pivotally to the handle, the secondary panel is mounted pivotally to the primary panel by several pivot wires extending from the secondary panel. Two pivot wires define two lateral edges of the secondary panel. Three pivot wires divide the substantially open portion into four leg openings for two seated children. Defining a back panel of the child seat, the tertiary panel includes similarly spaced wires and is mounted pivotally to the primary panel, below where the secondary panel is mounted pivotally thereto. The tertiary panel is engaged with the secondary panel so as to limit pivoting of the secondary panel upwardly or downwardly, at the second of the cross wires of the primary panel, and so as to limit pivoting of the tertiary panel away from the primary panel. The tertiary panel is disengageable from the secondary panel.

7 Claims, 6 Drawing Sheets

SHOPPING CART HAVING IMPROVED CHILD SEAT

TECHNICAL FIELD OF THE INVENTION

This invention pertains to a shopping cart comprising a handle, a handle mounting, to which the handle is mounted, a main basket, which also is mounted to the handle mounting, and a child seat, which is improved so as to confine the legs of a seated child within the main basket.

BACKGROUND OF THE INVENTION

Shopping carts of a type comprising a handle, a handle mounting, to which the handle is mounted, a main basket, which also is mounted to the handle, and a child seat, which is arranged so that a properly seated child faces backwardly, are in widespread use. Commonly, the main basket has side, bottom, front, and back panels made from welded wires, although it is known for some of the basket panels to be partially or predominantly plastic panels. Commonly, the child seat is made from welded wires, even if some of the basket panels may be partially or predominantly plastic.

Typically, the child seat is mounted suitably to a back panel of the main basket and the back panel is mounted pivotally to the handle mounting so as to permit the back panel and the child seat to be upwardly pivoted, as when a similar cart is nested into the shopping cart. Typically, the child seat is arranged so that such a seated child extends his or her legs through wide openings in the a back panel of the main basket, whereby the back panel of the main basket serves as a front panel of the child seat.

This invention has resulted from efforts to improve the child seat of a shopping cart of the type noted above so as to confine the legs of a seated child within the main basket of the shopping cart.

SUMMARY OF THE INVENTION

Broadly, this invention provides a shopping cart comprising a handle, a handle mounting, to which the handle is mounted, a main basket, which also is mounted to the handle mounting, and a child seat, in which a properly seated child faces backwardly. As improved so as to confine the legs of a properly seated child within the main basket, the child seat comprises a primary panel, a secondary panel, and a tertiary panel.

Defining a back panel of the main basket and a front panel of the child seat, the primary panel is mounted pivotally to the generally vertical portions of the handle mounting. The primary panel constitutes means for confining the legs of a properly seated child within the main basket. Preferably, the primary panel is made from welded wires, which include generally parallel wires spaced from one another by not more than about two inches. Spacings of not more than about two inches permit the primary panel to confine the legs of most if not all children who are capable of being seated properly in child seats of shopping carts.

Defining a lower panel of the child seat, the secondary panel has a substantially open portion and a weight-supporting portion. Moreover, the secondary panel has at least three and possibly more pivot wires extending longitudinally from the secondary panel and mounted pivotally to the primary panel, below where the primary panel is mounted pivotally to the generally vertical portions of the handle mounting.

Two of the pivot wires of the secondary panel extend along the substantially open and weight-supporting portions of the secondary panel so as to define two lateral edges of those portions of the secondary panel. Moreover, at least one of the pivot wires of the secondary panel extends along the substantially open portion, between the pivot wires defining the lateral edges, so as to divide the substantially open portion into at least two leg openings for a child seated properly on the weight-supporting portion of the secondary panel. Thus, the leg openings permit such a seated child to dangle his or her legs through the leg openings, within the main basket. Preferably, at least two and possibly more of the pivot wires of the secondary panel extend along the substantially open portion, between the pivot wires defining the lateral edges, so as to divide the substantially open portion into at least three and possible four leg openings for two children seated properly on the weight-supporting portion of the secondary panel.

Defining a back panel of the child seat, the tertiary panel is mounted pivotally to the primary panel, below where the secondary panel is mounted pivotally to the primary panel. The tertiary panel is engaged with the secondary panel so as to restrain the secondary panel against pivoting upwardly or downwardly, so as to restrain the tertiary panel against pivoting away from the primary panel, but so as to permit pivoting of the tertiary panel toward the primary panel. The tertiary panel is disengagable from the secondary panel so as to permit pivoting of the secondary panel downwardly.

In a preferred embodiment of this invention, the primary panel is made from welded main and cross wires. The main wires of the primary panel extend in generally vertical directions and are spaced from one another by not more than about two inches. The cross wires of the primary panel extend across the primary panel and are spaced vertically from one another. The primary panel is mounted pivotally to the generally vertical portions of the primary panel, at a first of the cross wires.

In the preferred embodiment, moreover, the secondary panel is made from welded cross and pivot wires. The cross wires of the secondary panel are spaced from one another by not more than about two inches and extend laterally across the weight-supporting portion but not across the substantially open portion. The pivot wires of the secondary panel extend longitudinally and are mounted pivotally to a second of the cross wires of the primary panel, below the first of the cross wires of the primary panel.

In the preferred embodiment, furthermore, the tertiary panel is formed of welded wires including generally parallel wires spaced from one another by not more than about two inches. The tertiary panel is mounted pivotally to a third of the cross wires of the primary panel, below the second of the cross wires of the primary panel.

These and other objects, features, and advantages of this invention are evident from the following description of a preferred embodiment of this invention with reference to the accompanying drawings.

DETAILED DESCRIPTION OF THE PREFERRED EMBODIMENT

As shown, a shopping cart 10 constituting a preferred embodiment of this invention comprises a handle 20, a handle mounting 22, to which the handle 20 is mounted, a main basket 30, which also is mounted to the handle 20, and a child seat 40, which is improved so as to confine the legs of a properly seated child within the main basket 30.

The handle mounting 22, which is made from steel wires, as shown, or from a steel tube, has generally vertical portions 24 spaced laterally from each other and mounting the handle 20 in a known manner. The main basket 30 has side, front, and bottom panels, which may be predominantly wire panels, as shown, or which may be partially or predominantly plastic panels. The main basket 30 is mounted to two generally vertical portions 26 of the handle mounting 22 in a known manner so as to project frontwardly from the handle 20. The handle 20, the handle mounting 22, and the main basket 30 are mounted to a wheeled chassis (not shown) in a known manner. Except as known in the drawings and described herein, details of the handle 20, the handle mounting 22, the main basket 30, and the wheeled chassis are outside the scope of this invention.

Being made from welded main and cross wires, a primary panel 50 of the child seat 40 defines a back or gate panel of the main basket 30 and a front panel of the child seat 40. The main wires 52 of the primary panel 50 extend in generally vertical directions, from an upper edge of the primary panel 50 to a lower edge of the primary panel 50, and are spaced from one another by not more than about two inches. The cross wires 54 of the primary panel 50 are welded to the main wires 52, extend across the primary panel 50, and are spaced vertically from one another. Some of the cross wires 54 are spaced widely from others of the cross wires 54. The primary panel 50 is mounted pivotally to the generally vertical portions 26 of the handle 20, at a first or uppermost wire 54A of the cross wires 54, in a known manner, which may be as disclosed in Mainard et al. U.S. Pat. No. 5,470,087. The first or uppermost wire 54A may be thus called a hinge wire.

Figure 2:
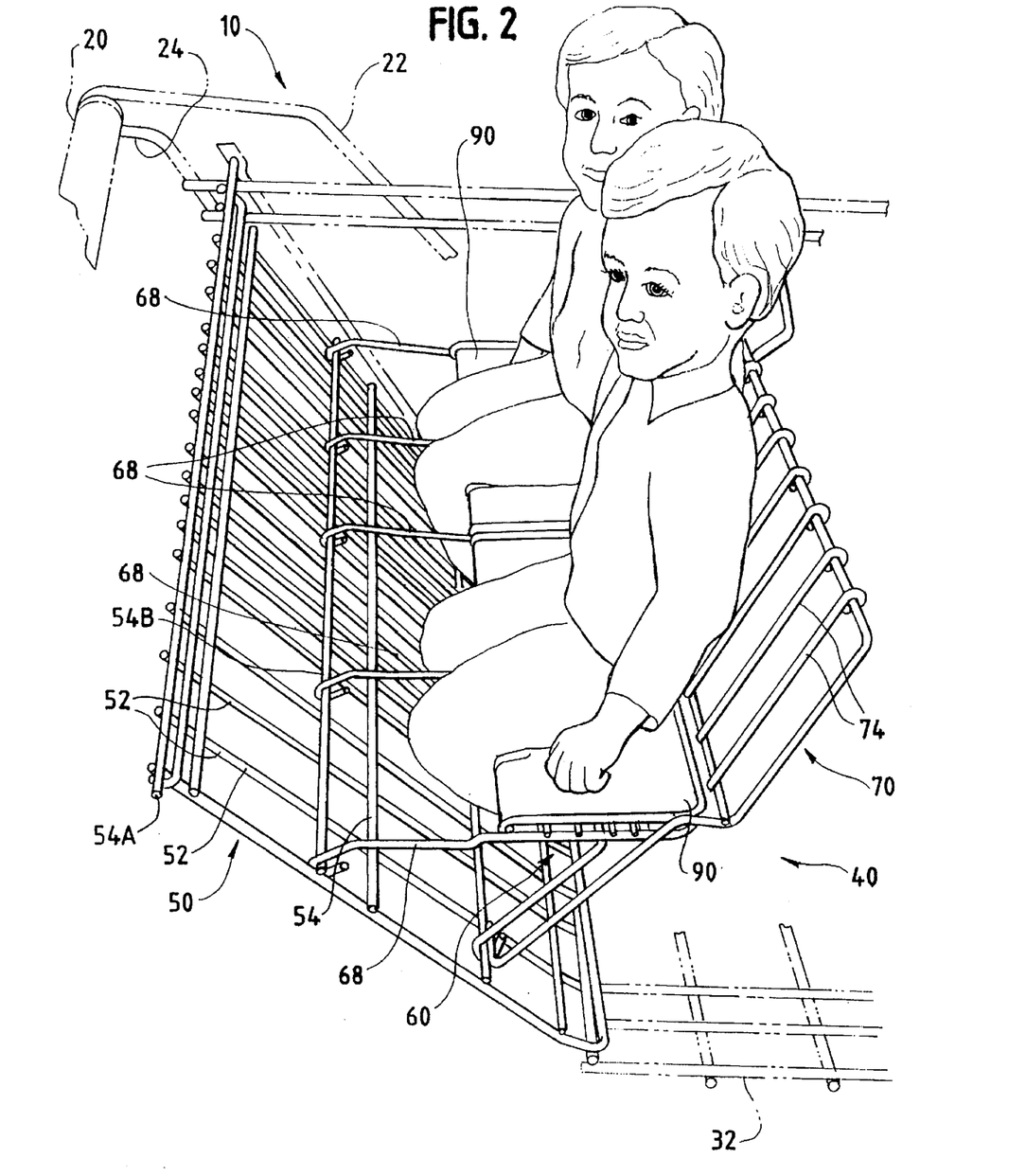
FIG. 2 is a similar view showing two children seated on the child seat and facing backwardly.

A secondary panel 60 of the child seat 40 defines a lower panel of the child seat 40 and is made from welded cross and pivot wires so as to have a substantially open portion 62 and a weight-supporting portion 64. The cross wires 66 of the secondary panel 60 extend laterally across the weight-supporting portion 64 but not across the substantially open portion 62 and are spaced from one another by not more than about two inches. The pivot wires 68 of the secondary panel 60 are welded to the cross wires 66. Two of the pivot wires 68 extend along the substantially open portion 62 and along the weight-supporting portion 64 so as to define two lateral edges of the substantially open portion 62 and the weight-supporting portion 64. Three of the pivot wires 68 extend along the substantially open portion 62 and along the weight-supporting portion 64, between the pivot wires 68 defining the lateral edges, so as to divide the substantially open portion 62 into four leg openings for two children seated so that their weights are supported by the weight-supporting portion 64. These leg openings include two outer openings 42, each to accommodate one leg of a seated child, and two inner openings 46, each to accommodate one leg of each of a seated child. As shown in FIG. 2, these leg openings 42, 44, permit each of the seated children to dangle his or her legs through these leg openings 42, 44, within the main basket 30. If the middle wire 68 were omitted, two seated children would share one leg opening (not shown) between the leg openings 42.

Whether defining one of the lateral edges or dividing the substantially open portion 62, each pivot wire 68 is bent around a cross wire 54B of the primary panel 50 so as to be pivotally mounted to the primary panel 50, below the cross wire 54A where the primary panel 50 is mounted pivotally to the generally vertical portions 26 of the handle 20. Thus, via the pivot wires 68, the secondary panel 60 is mounted pivotally to the primary panel 50.

A tertiary panel 70 defines a back panel of the child seat 40 and is made from welded wires, which include, in an upper portion of the tertiary panel 70, generally vertical, generally parallel wires 72 spaced from one another by not more than about two inches, a frame wire 74 welded to the generally vertical wires 72, and a brace wire 76 welded thereto. In a lower portion of the tertiary panel, opposite ends of the frame wire 74 extend downwardly and are bent around a cross wire 54C of the primary panel 50, so as to mount the tertiary panel 70 pivotally to the primary panel 50.

The tertiary panel 70 has a catch wire 78, which extends between and is welded to the downwardly extending ends of the frame wire 74, beneath the upper portion wires 72. The secondary panel 60, beneath the weight-supporting portion 64, has a hook wire 80, which is welded to some of the cross wires 66. The hook wire 80 is bent so as to define two laterally spaced, downwardly and backwardly opening hooks 82, which are adapted to receive the catch wire 78.

Figure 1:
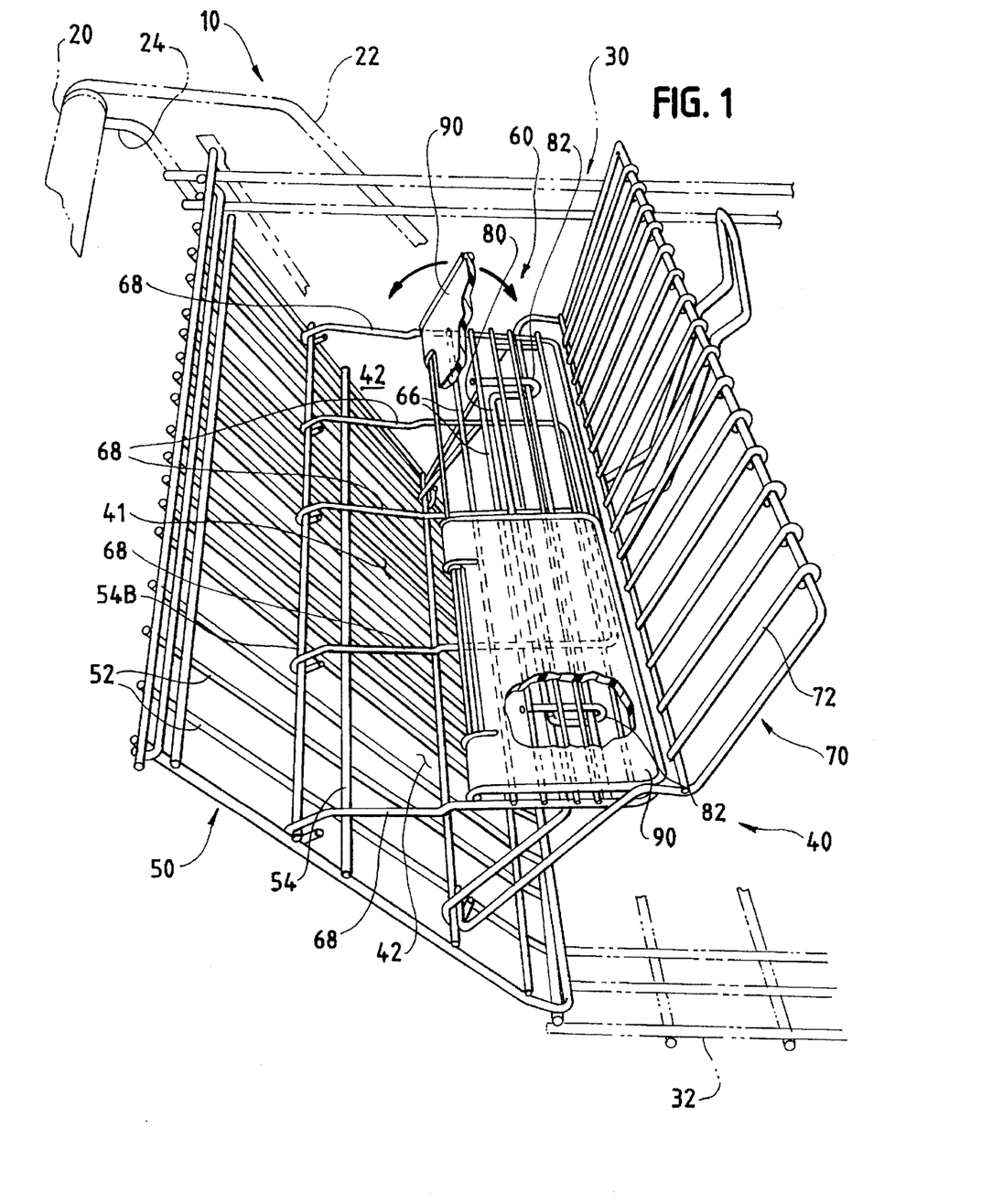
FIG. 1 is a fragmentary, perspective view of a shopping cart comprising a handle, a main basket, and a child seat improved by this invention. The handle and the main basket are shown fragmentarily, in broken lines.
Figure 3:
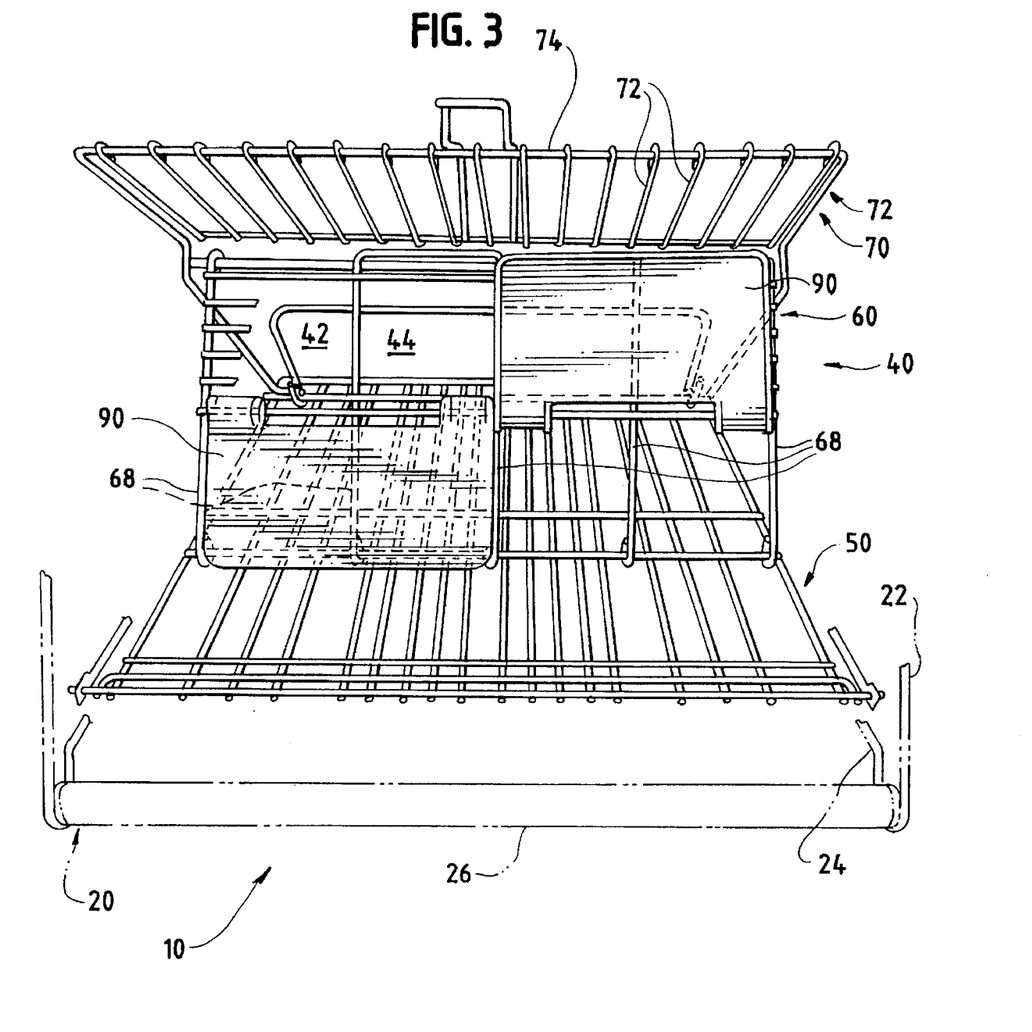
FIG. 3 is a fragmentary, plan view of the handle and the child seat. The handle is shown fragmentarily, in broken lines.

As shown in FIGS. 1, 2, and 3, two substantially rigid, plastic flaps 90 are mounted to the secondary panel 60, at the cross wire 66A bordering the substantially open portion 62, so as to be individually positionable either in a position overlying the weight-supporting portion 64 or in a position overlying the substantially open portion 62. In the position overlying the weight-supporting portion 64, each of the plastic flaps is supported by the cross wires 66 other than the cross wire 66A. In the position overlying the substantially open portion 62, each of the plastic flaps 90 is supported by one of the pivot wires 68 dividing the substantially open portion 62 into three leg openings.

Figure 4:
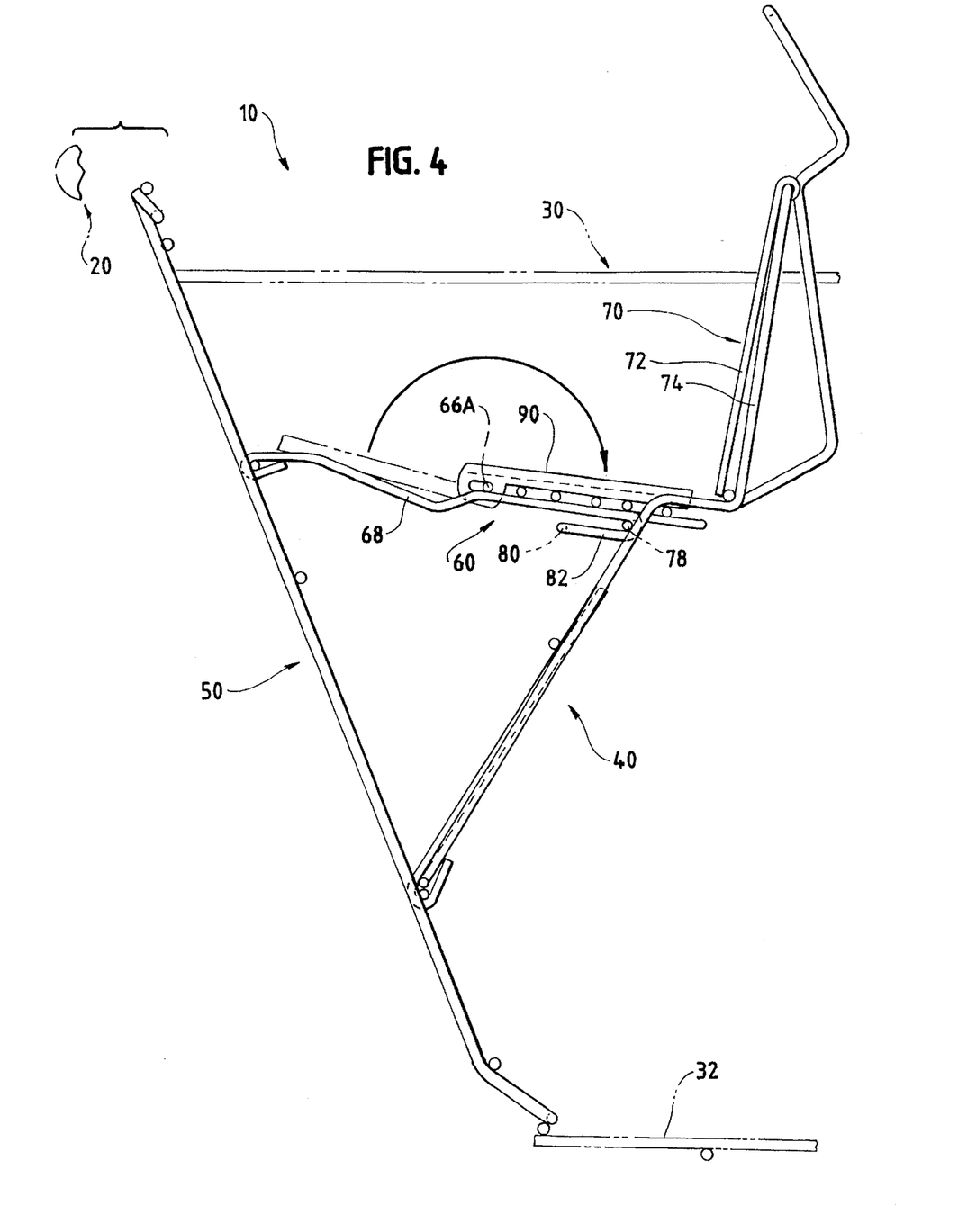
FIGS. 4, 5, and 6 are fragmentary, schematic, side views showing the child seat respectively in a fully erected, usage condition, a partly collapsed, intermediate condition, and a fully collapsed, storage condition.

As shown in FIG. 4, in the fully erected or usage condition of the child seat 40, the primary panel 50 is pivoted downwardly so as to rest on a lower panel 32 of the main basket 30. Also, along with the plastic flaps 90, the secondary panel 60 is pivoted upwardly so as to be generally horizontal. Moreover, the tertiary panel 70 is pivoted away from the primary panel 50, until the catch wire 78 is received by the hooks 82. Thus, so long as the catch wire 78 is received by the hooks 82, the tertiary panel 70 is engaged with the secondary panel 60 so as restrain the secondary panel 60 against pivoting upwardly or downwardly, so as to restrain the tertiary panel 70 against pivoting away from the primary panel 50, but so as to permit pivoting of the tertiary panel 70 toward the primary panel 50. Because of their weights, the secondary panel 60, the tertiary panel 70, and any child seated in the child seat 40 tend to press the catch wire 78 into the hooks 82, whereby it is difficult for the tertiary panel 70 to be accidentally disengaged from the secondary panel 50.

Figure 5:
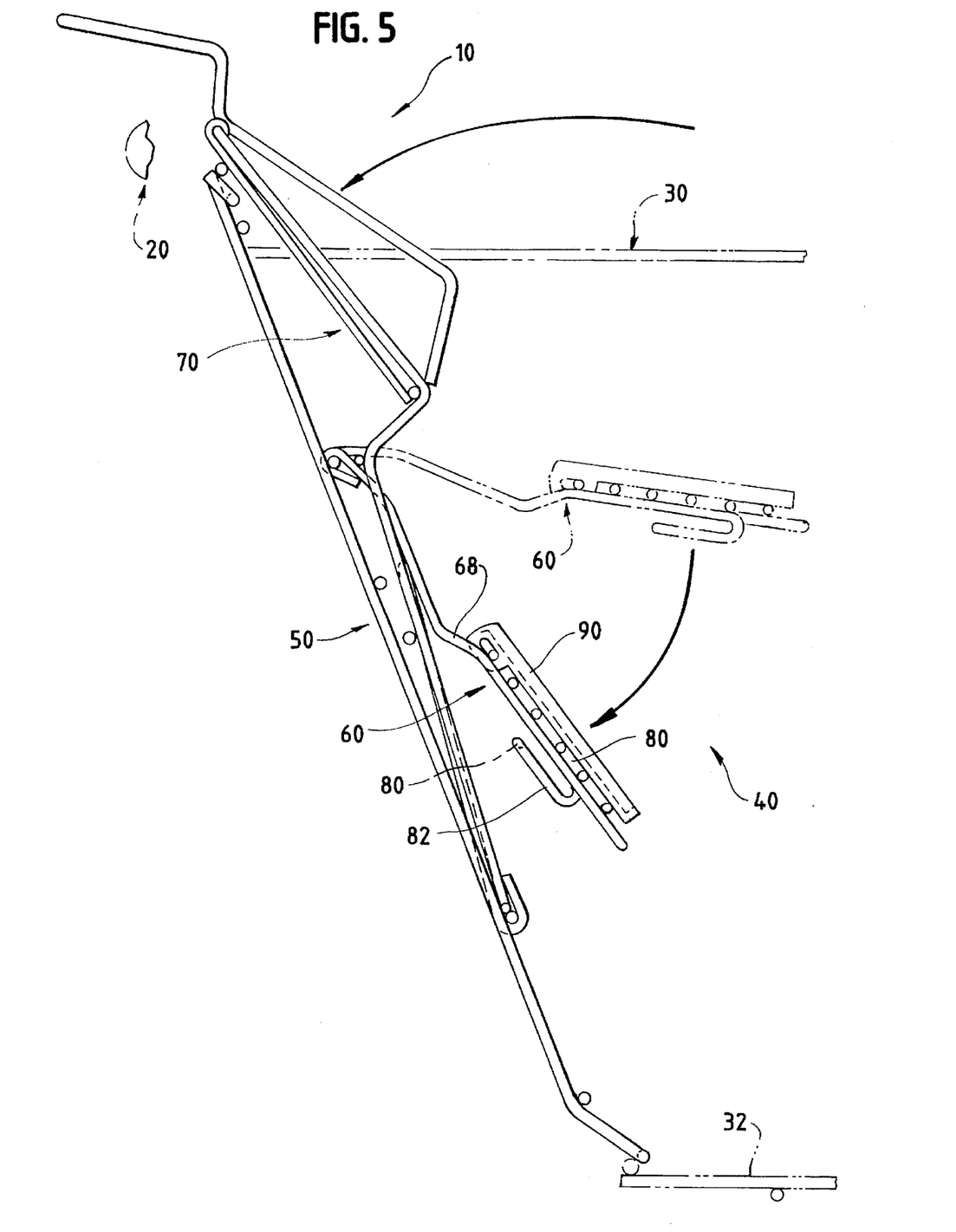
Figure 6:
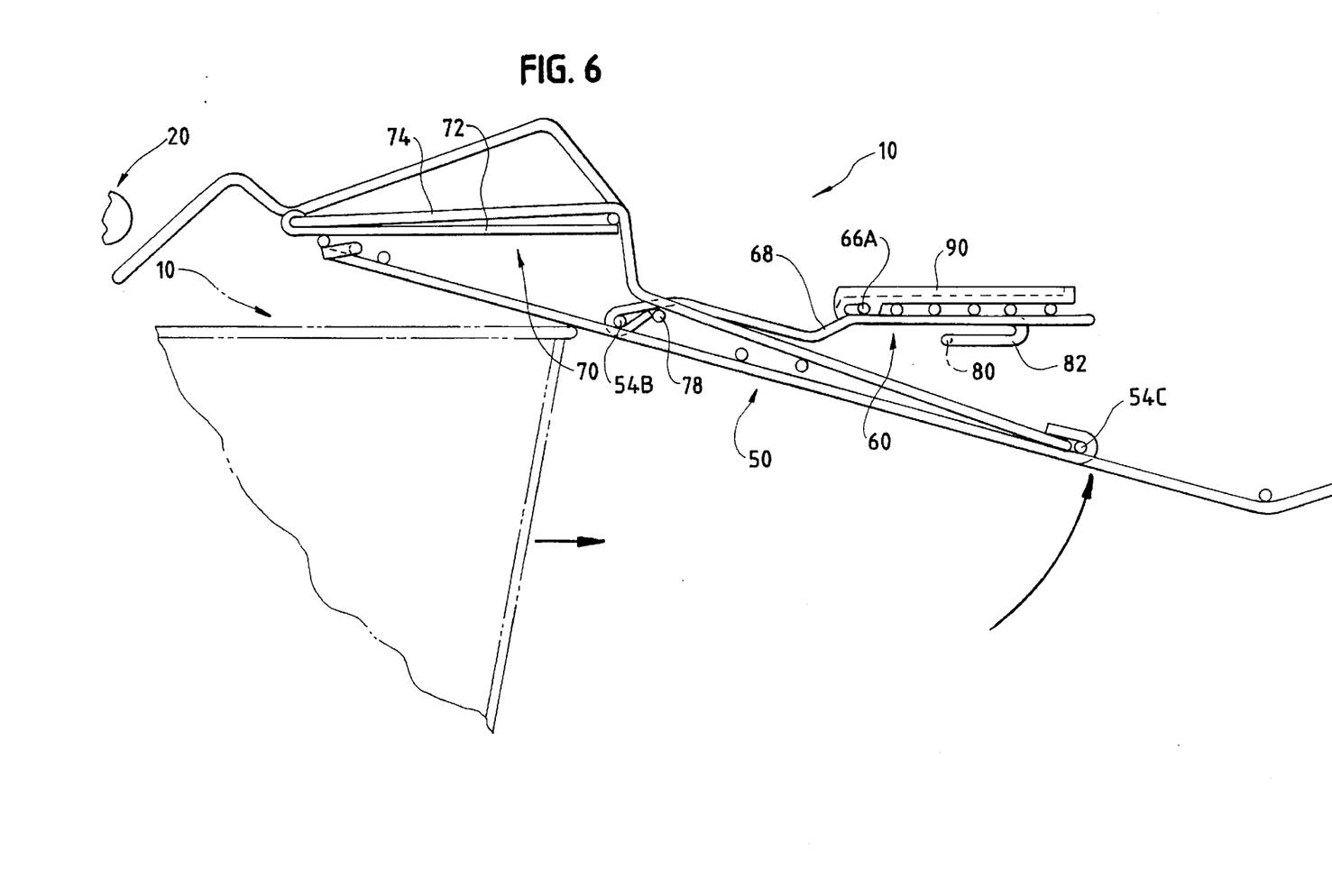

As shown in FIG. 5, when tertiary panel 70 is pivoted toward the primary panel 50 so as to remove the catch wire 78 from the hooks 82, the tertiary panel 70 is disengaged from the secondary panel 60 so as to permit pivoting of the secondary panel 60 downwardly toward the primary panel 50 until the child seat 40 is placed in its partially collapsed condition, in which the primary panel 50 continues to rest on the lower panel 32 of the main basket 30. As shown in FIG. 6, when a similar cart 10' is nested into the shopping cart 10 in a known manner, the primary panel 50 can be then pivoted upwardly so as to accommodate the similar cart 10' being nested thereinto. When the primary panel 50 is pivoted upwardly, the secondary panel 60 and the tertiary panel 70 are carried upwardly with the primary panel 50.

Various modifications may be made in the preferred embodiment described above without departing from the scope and spirit of this invention.

We claim:

1. A shopping cart comprising a handle, a handle mounting, to which the handle is mounted, a main basket, which also is mounted to the handle mounting, and a child seat comprising (a) a primary panel defining a back panel of the main basket and a front panel of the child seat, wherein the primary panel is mounted pivotally to the generally vertical portions of the handle, (b) a secondary panel having a substantially open portion and a weight-supporting portion and defining a lower panel of the child seat, wherein the secondary panel has at least three pivot wires extending longitudinally from the secondary panel and mounted pivotally to the primary panel, below where the primary panel is mounted pivotally to the generally vertical portions of the handle, wherein two of the pivot wires of the secondary panel extend along the substantially open and weight-supporting portions of the secondary panel so as to define two lateral edges of the substantially open and weight-supporting portions of the secondary panel, and wherein at least one of the pivot wires of the secondary panel extends along the substantially open portion, between the pivot wires defining the lateral edges of the substantially open portion, so as to divide the substantially open portion into at least two leg openings for a child seated so that his or her weight is supported by the weight-supporting portion of the secondary panel, the leg openings permitting such a seated child to dangle his or her legs through the leg openings, within the main basket, and (c) a tertiary panel defining a back panel of the child seat and mounted pivotally to the primary panel, below where the secondary panel is mounted pivotally to the primary panel, the tertiary panel being engaged with the secondary panel so as to restrain the secondary panel against pivoting upwardly or downwardly, so as to restrain the tertiary panel against pivoting away from the primary panel, but so as to permit pivoting of the tertiary panel toward the primary panel, the tertiary panel being disengagable from the secondary panel so as to permit pivoting of the secondary panel downwardly, wherein the primary panel constitutes means for confining the legs of such a seated child within the main basket.

2. The shopping cart of claim 1 wherein at least two of the pivot wires of the secondary panel extend along the substantially open portion, between the pivot wires defining the lateral edges of the substantially open portion, so as to divide the substantially open portion into at least three leg openings for two children seated so that their weights are supported by the weight-supporting portion of the secondary panel.

3. The shopping cart of claim 1 wherein the primary panel is made from welded wires including generally parallel wires spaced from one another by not more than about two inches.

4. The shopping cart of claim 2 wherein the primary panel is made from welded wires including generally parallel wires spaced from one another by not more than about two inches.

5. A shopping cart comprising a handle, a handle mounting, to which the handle is mounted, a main basket, which also is mounted to the handle mounting, and a child seat comprising (a) a primary panel defining a back panel of the main basket and a front panel of the child seat and being made from welded main and cross wires, wherein the main wires of the primary panel extend in generally vertical directions and are spaced from one another by not more than about two inches, wherein the cross wires of the primary panel extend across the primary panel and are spaced vertically from one another, and wherein the primary panel is mounted pivotally to the generally vertical portions of the handle, at a first of the cross wires of the primary panel, (b) a secondary panel having a substantially open portion and a weight-supporting portion, defining a lower panel of the child seat, and being made from welded cross and pivot wires, wherein the cross wires of the secondary panel are spaced from one another by not more than about two inches and extend laterally across the weight-supporting portion but not across the substantially open portion, wherein the pivot wires of the secondary panel extend longitudinally and are mounted pivotally to a second of the cross wires of the primary panel, below the first of the cross wires of the primary panel, wherein two of the pivot wires of the secondary panel extend along the substantially open and weight-supporting portions of the secondary panel so as to define two lateral edges of substantially open and weight-supporting portions of the secondary panel, and wherein at least one of the pivot wires of the secondary panel extends along the substantially open portion, between the pivot wires defining the lateral edges of the substantially open portion, so as to divide the substantially open portion into at least two leg openings for a child seated so that his or her weight is supported by the weight-supporting portion of the secondary panel, the leg openings permitting such a child to dangle his or her legs through the leg openings, within the main basket, and (c) a tertiary panel defining a back panel of the child seat and being formed of welded wires including generally parallel wires spaced from one another by not more than about two inches, the tertiary panel being mounted pivotally to a third of the cross wires of the primary panel, below the second of the cross wires of the primary panel, the tertiary panel being engaged with the secondary panel so as to restrain the secondary panel against pivoting upwardly or downwardly, so as to restrain the tertiary panel against pivoting away from the primary panel, but so as to permit pivoting of the tertiary panel toward the primary panel, the tertiary panel being disengagable from the secondary panel so as to permit pivoting of the secondary panel downwardly, wherein the primary panel constitutes means for confining the legs of such a seated child within the main basket.

6. The shopping cart of claim 5 wherein at least two of the pivot wires of the secondary panel extend along the substantially open portion, between the pivot wires defining the lateral edges of the substantially open portion, so as to divide the substantially open portion into at least three leg openings for two children seated so that their weights are supported by the weight-supporting portion of the secondary panel.

7. The shopping cart of claim 5 wherein three of the pivot wires of the secondary panel extend along the substantially open portion, between the pivot wires defining the lateral edges of the substantially open portion, so as to divide the substantially open portion into four leg openings for two children seated so that their weights are supported by the weight-supporting portion of the secondary panel.

* * * * *